(12) United States Patent
Taylor

(10) Patent No.: US 6,189,644 B1
(45) Date of Patent: Feb. 20, 2001

(54) EMERGENCY BRAKE LOCK ASSEMBLY

(75) Inventor: Steven C. Taylor, Whitewater, WI (US)

(73) Assignee: Nelson's Bus Service, Inc., Whitewater, WI (US)

(*) Notice: Under 35 U.S.C. 154(b), the term of this patent shall be extended for 0 days.

(21) Appl. No.: 09/266,517

(22) Filed: Mar. 11, 1999

(51) Int. Cl.$^7$ ..................................................... B60D 1/28
(52) U.S. Cl. .......................... 180/271; 180/275; 303/6.1
(58) Field of Search ................................. 180/271, 275, 180/281, 286, 287; 303/6.01, 6.1

(56) References Cited

U.S. PATENT DOCUMENTS

| 2,152,084 | 3/1939 | Paine | 303/6.1 |
|---|---|---|---|
| 2,318,610 | 5/1943 | Hyatt et al. | 303/6.1 |
| 2,866,511 | 12/1958 | Niederoest | 180/82 |
| 3,893,697 | 7/1975 | Blitz et al. | 180/111 |
| 3,929,033 | 12/1975 | Marx | 74/512 |
| 4,074,787 | 2/1978 | Cunningham et al. | 180/82 |
| 4,909,096 | 3/1990 | Kobayashi | 74/538 |
| 5,505,528 | 4/1996 | Hamann et al. | 303/89 |
| 5,839,304 | * 11/1998 | Wills | 70/175 |

* cited by examiner

Primary Examiner—Brian L. Johnson
Assistant Examiner—Faye M. Fleming
(74) Attorney, Agent, or Firm—Andrus, Sceales, Starke, Sawall

(57) ABSTRACT

An emergency brake lock assembly that locks an emergency brake actuator in an engaged position to prevent the vehicle from moving while a lift assembly contained on the vehicle is being operated. The emergency brake lock assembly includes an emergency brake switch that is positioned to detect movement of the emergency brake actuator between an engaged position and a disengaged position. When the emergency brake actuator is in the engaged position, the emergency brake switch generates a brake engaged signal. An auxiliary door switch is positioned to detect the movement of an auxiliary door contained on the vehicle. When the auxiliary door opens, the auxiliary door switch generates a door open signal. Upon receiving both the door open signal and the brake engaged signal, a solenoid actuator moves a locking member to a locked position to retain the emergency brake actuator in the engaged position. The lift assembly positioned in the auxiliary door is energized only when the auxiliary door is open and the emergency brake actuator is locked in the engaged position, preventing the vehicle from moving during lift operations.

18 Claims, 4 Drawing Sheets

EMERGENCY BRAKE LOCK ASSEMBLY

BACKGROUND OF THE INVENTION

The present invention relates to an emergency brake lock assembly for use with vehicles. More specifically, the present invention relates to an emergency brake lock assembly for use in vehicles that have an auxiliary door and lift assembly. The emergency brake lock assembly prevents the vehicle from moving while the lift assembly is being operated.

Buses that are used to transport handicapped passengers confined to wheelchairs typically include an auxiliary door formed in either the side of the bus or at the rear of the bus. When the auxiliary door is open, a lift assembly having a vertically movable platform is used to load and unload the wheelchair passengers from the bus through the auxiliary door. During loading and unloading, it is critical that the bus remain stationary to prevent injury to the wheelchair passengers and pedestrians.

In order to prevent the bus from moving while a wheelchair passenger is being loaded and/or unloaded, brake interlock systems have been developed that tap into the hydraulic brake lines of the bus to lock the bus brakes while the lift assembly is being operated. While this type of system functions well to prevent inadvertent movement of the bus while the lift assembly is being operated, the system suffers from several significant drawbacks.

For example, if the brake interlock device identified above is retrofit into a previously manufactured bus, a mechanic must tap into the hydraulic brake fluid lines in the bus in order to install the brake interlock device. According to the brake warranty offered by many bus manufacturers, if the hydraulic brake fluid system is modified, the manufacturer's warranty for the braking system is rendered void. Thus, when retrofitting existing buses including wheelchair transports, the owner of the bus is hesitant to install a brake interlock device that tampers with the existing hydraulic braking system.

Additionally, installing a brake interlock device that taps into the hydraulic braking system of the bus is difficult and time consuming. Typically, to install the interlock the mechanic must have access to the underside of the bus, which may require the mechanic to work on his back beneath the bus. When installing the brake interlock device, the mechanic must be sure not to introduce any leaks into the braking system that would drain the hydraulic fluid from the braking system, thus rendering the vehicle brake system ineffective.

Therefore, it is an object of the present invention to provide an emergency brake lock assembly that can be easily retrofit to existing vehicles without tampering with the existing hydraulic braking system. It is an additional object of the invention to provide an emergency brake lock assembly that prevents the vehicle from moving while the auxiliary door is open and the lift assembly is being operated. It is a further object of the invention to provide an emergency brake lock assembly that energizes the lift assembly only when the emergency brake is engaged and the emergency brake actuator is securely held in the engaged position. It is an additional object of the invention to provide an emergency brake lock assembly that includes a locking member that engages the emergency brake actuator contained in the bus and locks the emergency brake actuator in the engaged position. It is an additional object of the invention to sense the opening of the auxiliary door and engagement of the emergency brake to both retain the emergency brake actuator in the engaged position and energize the lift assembly.

SUMMARY OF THE INVENTION

The present invention is an emergency brake lock assembly that prevents a vehicle from moving while a lift assembly positioned in an auxiliary door of the vehicle is being operated. The emergency brake lock assembly includes a locking member positioned on a mounting plate that is secured within the interior of the vehicle near the emergency brake actuator that operates the vehicle's emergency brakes. The emergency brake actuator is movable between an engaged position in which the emergency brake prevents the vehicle from moving, and a disengaged position in which the emergency brakes are released and the vehicle is free to move. When the emergency brake actuator is moved into its engaged position, the emergency brake actuator contacts an emergency brake switch mounted to the mounting plate. Upon being actuated, the emergency brake switch generates a brake engaged signal and connects the ground circuit to the auxiliary door switch.

In addition to the emergency brake switch, the emergency brake lock assembly uses an auxiliary door switch that is positioned to detect the opening and closing of the auxiliary door. Specifically, the auxiliary door switch is positioned such that the auxiliary door contacts the auxiliary door switch when the auxiliary door is closed. When the auxiliary door is open, the auxiliary door switch generates a door open signal and completes the ground circuit to the emergency brake lock assembly.

During use of the emergency brake lock assembly, when the emergency brake actuator is engaged and the auxiliary door is open, a solenoid actuator moves a locking member to its locked position. When the locking member is in the locked position, the locking member engages and retains the emergency brake actuator in the locking claw of the locking member. As long as the door open signal and brake engaged signal are being generated, the locking member remains in the locked position to retain the emergency brake actuator in the engaged position. Thus, when the auxiliary door is open and the emergency brake is engaged, the emergency brake lock assembly provides a mechanical interlock that locks the emergency brake actuator in the engaged position to prevent the vehicle from moving.

While the door open signal and brake engaged signal are being generated, the emergency brake lock assembly energizes the lift assembly such that the lift assembly can be used to lift wheelchair passengers into and out of the auxiliary door of the vehicle. Unless both the door open signal and the brake engaged signal are being generated, the lift assembly will not be energized. Thus, the lift assembly can be used only when the auxiliary door is open and the emergency brake is engaged, thereby preventing the vehicle from moving.

Once the wheelchair passengers have been loaded or unloaded, the lift assembly is moved to its stored position and the auxiliary door is closed. As the auxiliary door closes, it contacts the auxiliary door switch causing the auxiliary door switch to cease generating the door open signal. After the door open signal has been terminated, the solenoid actuator moves the locking member to the unlocked position thereby allowing the emergency brake actuator to be moved from the engaged position. Once the emergency brake actuator has been moved to the disengaged position, the vehicle can be operated in a normal manner.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
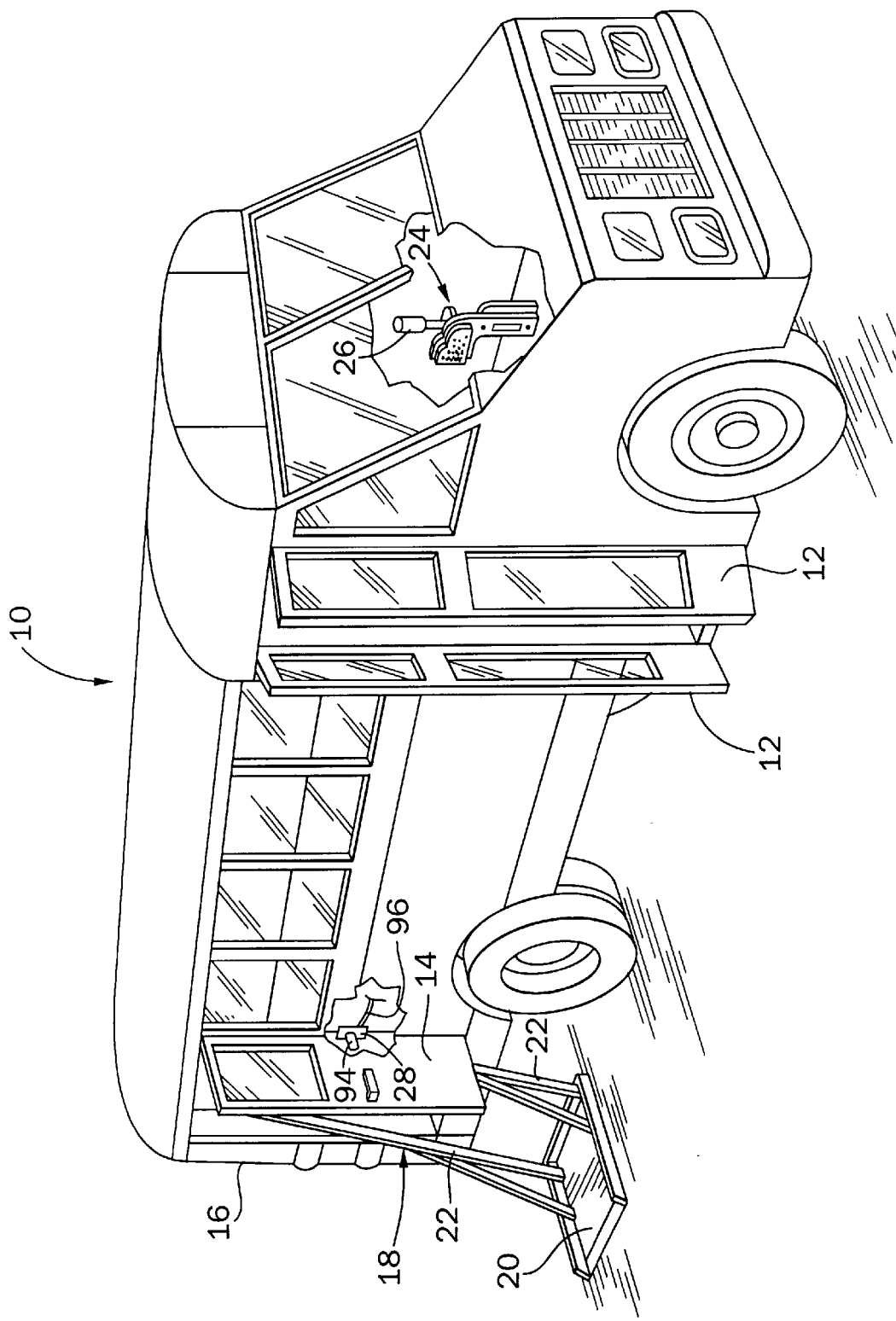
FIG. 1 is a perspective view, with sections removed, of a vehicle including an emergency brake lock assembly of the present invention.

FIG. 1 illustrates a vehicle 10 used to transport wheelchair-bound passengers. The vehicle 10, which is a modified school bus in the preferred embodiment, includes a pair of main doors 12 located near the front of the vehicle 10 and an auxiliary door 14 positioned on the same side of the bus as the main doors 12 and located near back end 16 of the vehicle 10. A lift assembly 18 is positioned within the auxiliary door opening and is operable to load and unload wheelchair-bound passengers into and out of the vehicle 10. The lift assembly 18 includes a horizontal support platform 20 that is vertically movable along a pair of lateral support rails 22 such that the lift assembly 18 can move the support platform 20 and a passenger positioned thereupon into and out of the vehicle 10. The lift assembly 18 is conventional equipment utilized in many vehicles currently being used and thus does not form any part of the present invention.

The vehicle 10 includes an emergency brake lock assembly 24 positioned adjacent to the emergency brake actuator 26. In the embodiment of the invention shown in FIG. 1, the emergency brake actuator 26 is a brake handle extending from the floor of the vehicle 10. The emergency brake lock assembly 24 uses an auxiliary door switch 28 positioned to interact with the auxiliary door 14 contained near the back end 16 of the vehicle 10. The combination of the emergency brake lock assembly 24 and the auxiliary door switch 28 combine to prevent the vehicle 10 from moving while the lift assembly 18 is being operated, as will be discussed in greater detail below. Additionally, the combination of the emergency brake lock assembly 24 and the auxiliary door switch 28 combine to prevent the lift assembly 18 from being operated unless the emergency brake actuator 26 is mechanically locked in its engaged position at which time the emergency brakes for the vehicle 10 are engaged.

Figures 2, 3:
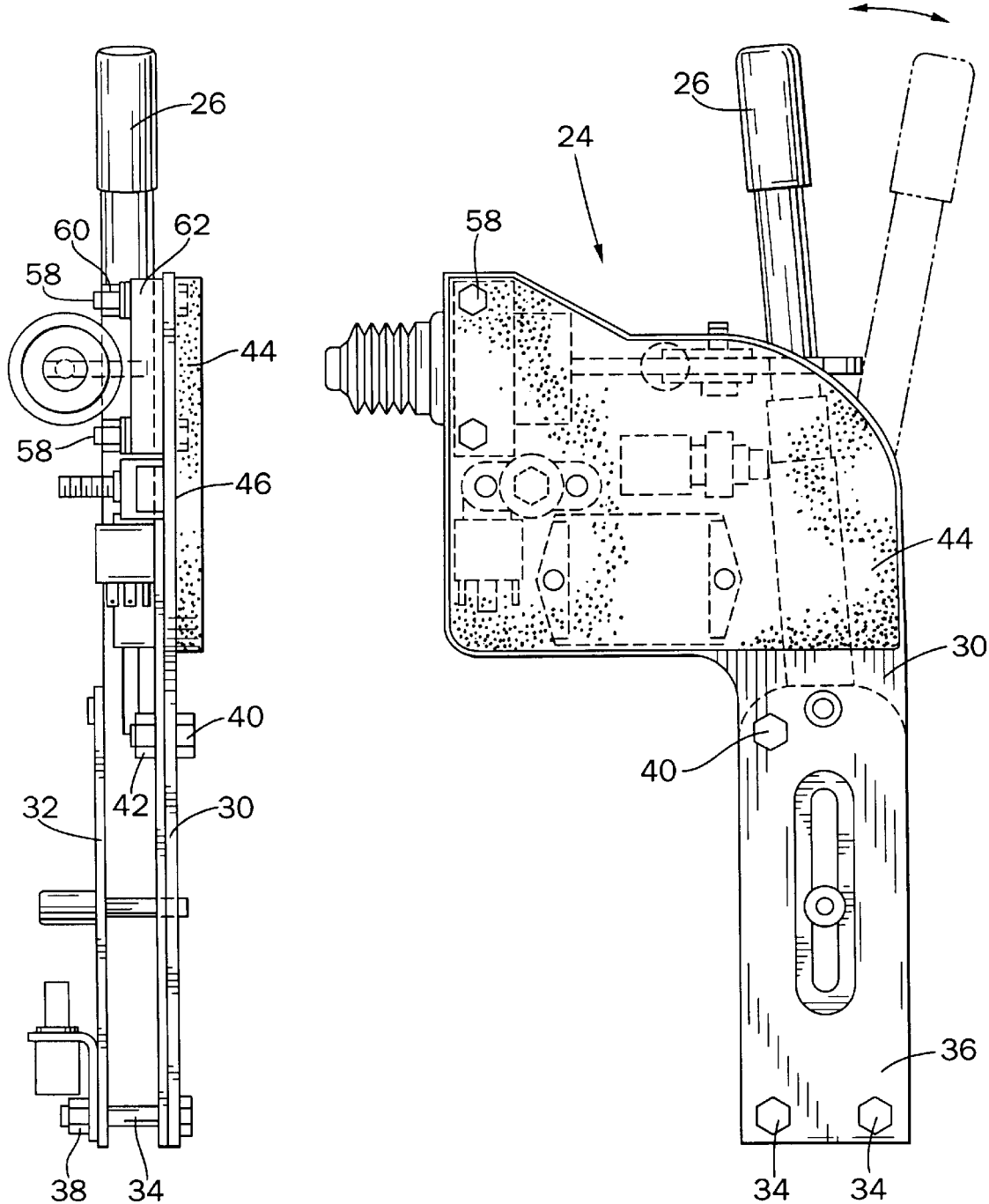
FIG. 2 is a back view of the emergency brake lock assembly.
FIG. 3 is a side view of the emergency brake lock assembly.
Figure 4:
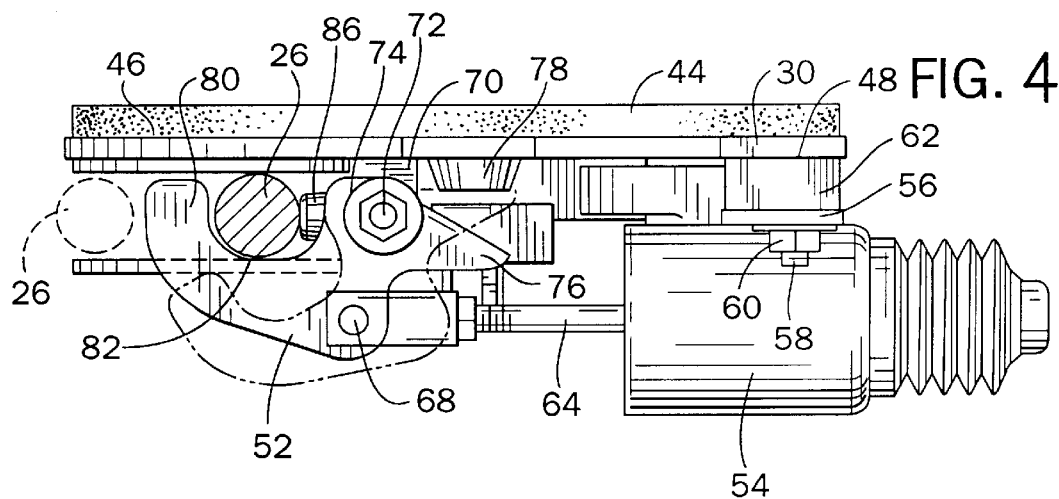
FIG. 4 is a top view of the emergency brake lock assembly illustrating the movement of a locking member between a locked position and an unlocked position.
Figure 5:
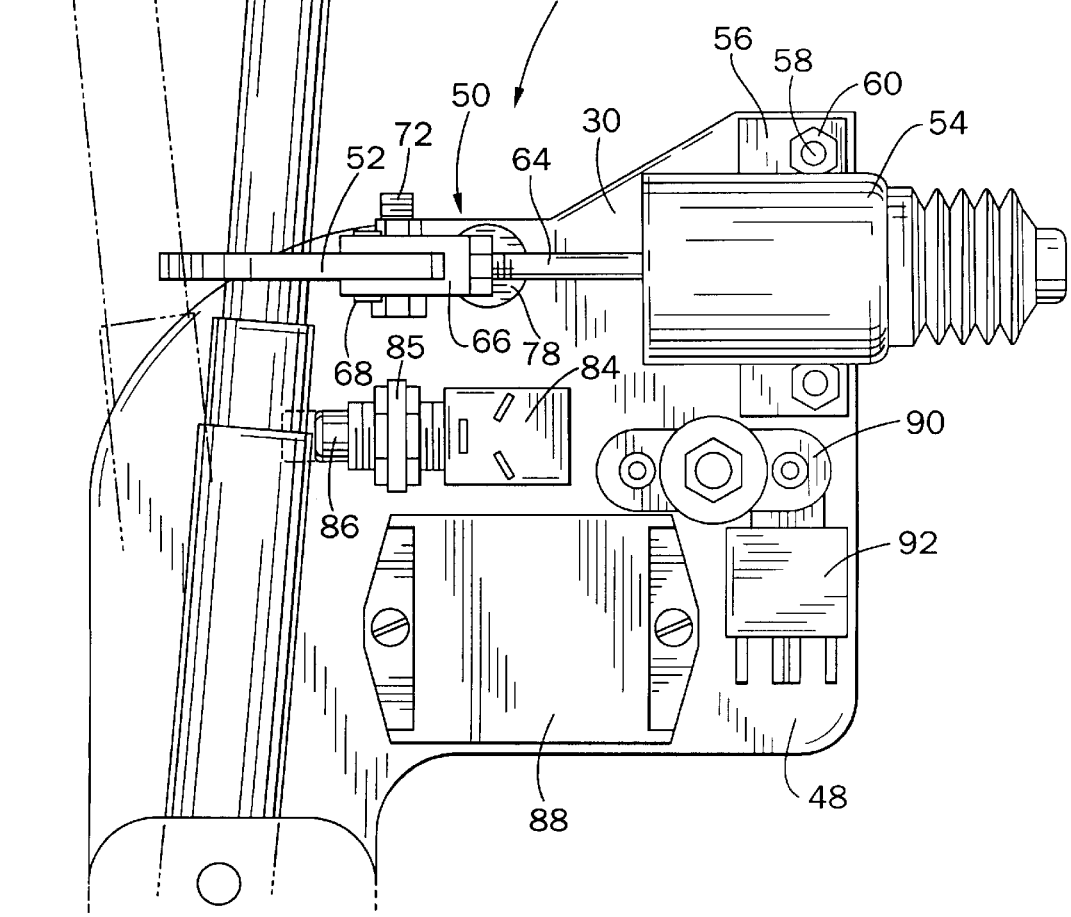
FIG. 5 is an enlarged partial side view of the emergency brake lock assembly illustrating the movement of an emergency brake actuator between an engaged position and a disengaged position.

Referring now to FIGS. 2–5, thereshown is the emergency brake lock assembly 24 of the present invention and the emergency brake actuator 26. As can be seen in FIGS. 3 and 5, the emergency brake actuator 26 is movable between an engaged position and a disengaged position shown in phantom in both FIGS. 3 and 5. When the emergency brake actuator 26 is in the engaged position, the emergency brakes of the vehicle are locked to prevent the vehicle 10 from moving. Likewise, when the emergency brake actuator 26 is in the disengaged position, the vehicle emergency brakes are released and the vehicle 10 can be operated in a conventional manner.

The emergency brake lock assembly 24 generally includes a mounting plate 30 that supports and correctly positions the operating components of the emergency brake lock assembly 24. As shown in FIGS. 2 and 3, the mounting plate 30 is joined to support bracket 32 for the emergency brake actuator 26. Specifically, a pair of connectors 34 pass through lower end 36 of the mounting plate 30 and are secured to the support bracket 32 by a pair of nuts 38. A connector 40 also passes through the mounting plate 30 and is secured to the support bracket 32 by nut 42. As can be understood in FIG. 1, the mounting plate 30 is positioned such that the emergency brake actuator 26 is located between the mounting plate 30 and the outer wall of the vehicle 10 when the actuator 26 is in the engaged position. In the preferred embodiment of the invention, mounting plate 30 is formed from heavy gauge steel to provide the required structural stability to support the operating components secured to the mounting plate 30.

As shown in FIGS. 2–4, a cushion member 44 is attached to the inner face surface 46 of the mounting plate 30. Since the mounting plate 30 is typically positioned near the leg of the seated vehicle driver when the vehicle 10 is being operated, the cushion member 44 provides a cushioned surface should the driver's leg contact the mounting plate 30.

Referring now to FIG. 5, the operating components for the emergency brake lock assembly 24 are shown mounted to the back face surface 48 of the mounting plate 30. The emergency brake lock assembly 24 includes a locking member 50 that is positioned to interlock the emergency brake actuator 26 when the emergency brake actuator 26 is in the engaged position. The locking member 50 generally includes a movable locking claw 52 and a solenoid actuator 54. The solenoid actuator 54 includes a support plate 56 that is joined to the mounting plate 30 by a pair of conventional connectors 58 and nuts 60. As can be seen in FIG. 4, a spacer block 62 is positioned between the back face surface 48 of the mounting plate 30 and the support plate 56 to provide the required spacing between the solenoid actuator 54 and the mounting plate 30. The solenoid actuator 54 is a commercially available electrically operated dual coil solenoid, such as Model No. 1757ES available from Synchro-Start Products, Inc., Niles, Ill.

The internal movable plunger of the solenoid actuator 54 is coupled to the locking claw 52 by a piston rod 64 and a clevis 66. The clevis 66 is connected to the locking claw 52 by a pivot member 68 such that the locking claw 52 is able to rotate within the opening defined between the upper and lower arms of the clevis 66.

The locking claw 52 is pivotally mounted to a support tab 70 attached to and extending from the back face surface 48 of the mounting plate 30. A pivot connector 72 passes through the support tab 70 and pivot portion 74 of the locking claw 52. The pivoting connection between the locking claw 52 and the support tab 70 allows the locking claw 52 to move between the locked position shown in FIG. 4 and an unlocked position as shown in phantom in FIG. 4. When the locking claw 52 moves to the unlocked position, an extended stop portion 76 of the locking claw 52 contacts a resilient stop member 78 secured to the mounting plate 30. The interaction between the stop portion 76 of the locking claw 52 and the resilient stop member 78 limits the counter-clockwise rotation of the locking claw 52. Additionally, the resilient stop member 78 acts as a sound dampener to reduce the noise generated by movement of the locking claw 52 from the locked position to the unlocked position.

The locking claw 52 is moved between the locked position and the unlocked position by activation of the solenoid actuator 54. When the solenoid actuator 54 is energized, the internal plunger and connected piston rod 64 are fully extended to cause the locking claw 52 to rotate clockwise, when viewed from above in FIG. 4, into the locked position. In the locked position, locking finger 80 retains the emergency brake actuator 26 within the curved retaining portion 82 of the locking claw 52 and prevents movement of the emergency brake actuator 26 from the engaged position. The curved retaining portion 82 is constructed having a sufficient amount of curvature such that the curved retaining portion 82 does not physically contact the emergency brake actuator 26 when the emergency brake actuator 26 is in the engaged position and the locking claw 52 is in the locked position. Since no physical contact occurs between the locking claw 52 and the emergency brake actuator 26, continued operation of the emergency brake lock assembly 24 will not result in wear on either the locking claw 52 or the emergency brake actuator 26.

When the solenoid actuator 54 is de-energized, the internal plunger and connected piston rod 64 are moved laterally into the solenoid actuator 54, causing the locking claw 52 to rotate in the counter-clockwise direction into the unlocked position shown in phantom in FIG. 4. When the locking claw 52 is in the unlocked position, the distance between the locking finger 80 and the mounting plate 30 is sufficient to permit the emergency brake actuator 26 to freely move between the engaged and disengaged positions without contacting the locking finger 80.

Referring now to FIG. 5, an emergency brake switch 84 is mounted to a support tab 85 extending from the back face surface 48 of the mounting plate 30. The emergency brake switch 84 includes a plunger 86 that is positioned to contact the emergency brake actuator 26 when the emergency brake actuator 26 is moved to its engaged position. When the emergency brake actuator 26 is in the disengaged position, as shown in phantom in FIG. 5, an internal spring within the emergency brake switch 84 biases the plunger 86 outward, as shown in phantom, at which time the plunger 86 is spaced from the emergency brake lock actuator 26. The emergency brake switch 84 is a conventional two circuit momentary push-button switch, such as Model No. 9165 available from Cole Hersee. When the emergency brake actuator 26 is moved to the engaged position, the actuator 26 contacts the plunger 86, causing the plunger 86 to be depressed. When the plunger 86 is depressed, the emergency brake switch 84 generates a brake engaged signal that is received by other components of the emergency brake lock assembly 24 in a manner that will be discussed in detail below.

FIG. 5 illustrates the remaining operating components of the emergency brake lock assembly 24, which include a pull coil timer 88, a terminal block 90 and a relay 92 that are attached to the back face surface 48 of the mounting plate 30. Although not shown in FIG. 5, these operating components are electrically connected by wires and the function of the pull coil timer 88, the terminal block 90 and the relay 92 will be discussed in greater detail below.

Referring back to FIG. 1, the auxiliary door switch 28 mounted in the doorway for the auxiliary door 14 includes a movable plunger 94 that is depressed when the auxiliary door is moved into a closed position. The plunger 94 is spring biased outward, such that when the auxiliary door 14 is opened, the plunger 94 is extended. When the plunger 94 is extended, the auxiliary door switch 28 generates a door open signal, thereby indicating the position of the auxiliary door 14. In the preferred embodiment of the invention, the auxiliary door switch 28 is a normally closed switch, such that when the auxiliary door 14 is open, the contacts within the auxiliary door switch 28 close. The auxiliary door switch 28 connects wires 96 that electrically couple the auxiliary door switch 28 to the operating components of the emergency brake lock assembly 24 mounted adjacent to the emergency brake actuator 26. Since the entire emergency brake lock assembly 24 and auxiliary door switch 28 are contained within the interior of the vehicle 10, installation of the emergency brake lock assembly 24 does not require access to the underside of the vehicle 10.

The operation of the emergency brake lock assembly 24 will now be described in detail, with specific reference to the electrical schematic of FIG. 6. Initially, when the vehicle 10 is being operated, the emergency brake actuator 26 is in the disengaged position such that the brakes of the vehicle 10 are disengaged and the vehicle 10 can be operated in a normal manner. Upon reaching the desired location for loading or unloading a wheelchair-bound passenger, the driver stops the vehicle 10 and pulls the emergency brake actuator 26 to the engaged position, as shown in FIG. 5. When the emergency brake actuator 26 is moved into the engaged position, the actuator 26 depresses the plunger 86 of the emergency brake switch 84, causing the emergency brake switch 84 to generate the brake engaged signal.

Figure 6:
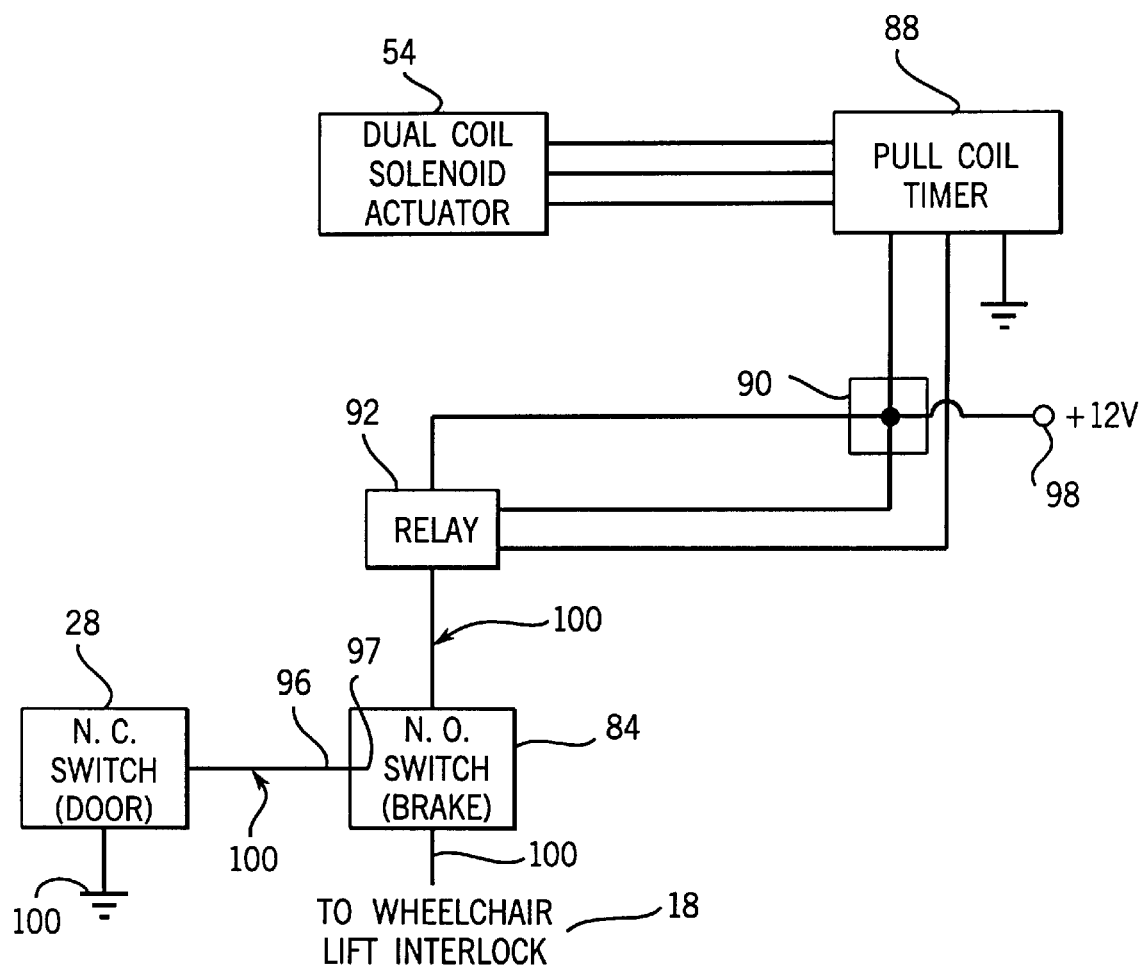
FIG. 6 is an electrical schematic diagram illustrating the control arrangement for the emergency brake lock assembly of the present invention.

As shown in FIG. 6, the emergency brake switch 84 is a normally open switch, such that when the plunger 86 is depressed, the contacts within the emergency brake switch 84 are closed. In the preferred embodiment of the invention, the emergency brake switch 84 includes a center terminal 97 that is connected to the auxiliary door switch 28 by wires 96, which are all part of the ground circuit 100.

After the emergency brake actuator 26 is moved to the engaged position, the vehicle driver exits the vehicle and opens the auxiliary door 14. When the auxiliary door 14 is open, the internal spring bias force extends the plunger 94 of the auxiliary door switch 28 and the contacts within the auxiliary door switch 28 move to their normally closed position. When the contacts within the auxiliary door switch 28 close, the ground circuit 100 is connected through the auxiliary door switch 28 to the center terminal 97 of the emergency brake switch 84.

Once the ground circuit 100 has been connected to the center terminal 97 of the emergency brake switch 84 and the plunger 86 remains depressed, the contacts within the emergency brake switch 84 connect the ground circuit 100 to the wheelchair lift assembly 18. The wheelchair lift assembly 18 is energized only upon opening of the auxiliary door 14 and movement of the emergency brake actuator 26 into the engaged position. At this time, the emergency brake switch 84 is generating the brake engaged signal and the auxiliary door switch 28 is generating the door open signal. Thus, the wheelchair lift assembly 18 can be operated only when the emergency brakes are engaged to prevent the vehicle 10 from being moved.

When the ground circuit 100 is connected to the relay 92 through the auxiliary door switch 28 and the emergency brake switch 84, the relay 92 connects the power supply 98 to the pull coil timer 88. The pull coil timer 88 is a conventional component, such as Model No. SA-4220-12 available from Synchro-Start Products, Inc., Niles, Ill. The pull coil timer 88 in turn operates the solenoid actuator 54. In the preferred embodiment of the invention, the solenoid actuator 54 includes both a "pull-in" coil and a "hold-in" coil. Initially, the pull coil timer 88 supplies power to the pull-in coil of the solenoid actuator 54. When power is applied to the pull-in coil of the solenoid actuator 54, the solenoid actuator 54 extends the piston rod 64 to move the locking claw 52 into its locked position, as shown in FIG. 4. After the initial power has been supplied to the pull-in coil to move the locking claw 52 into the locked position, the pull coil timer 88 sends power only to the hold-in coil of the solenoid actuator 54 to hold the locking claw 52 in the locked position. As is conventionally known, the hold-in coil of the dual coil solenoid actuator 54 requires substantially less current to hold the locking claw 52 in the locked position as compared to the amount of current supplied to the pull-in coil to initially move the locking claw 52 to the locked position.

When the locking claw 52 is in the locked position, the locking claw 52 creates a mechanical interlock that prevents the emergency brake actuator 26 from being moved from the engaged position to the disengaged position. Thus, the only time the wheelchair lift assembly 18 is energized is when the auxiliary door 14 is open and the emergency brake actuator 26 is securely locked in the engaged position by the locking claw 52, thereby preventing movement of the vehicle 10.

After the wheelchair lift assembly 18 has been energized, the driver can operate the wheelchair lift assembly 18 to load and unload wheelchair-bound passengers in a conventional manner. Once the driver has completed the loading or unloading process, the driver closes the auxiliary door 14 which depresses the plunger 94 of the auxiliary door switch 28 to open the contacts within the auxiliary door switch 28. Once the contacts of the auxiliary door switch 28 have been opened, the ground circuit 100 at the center terminal 97 of the emergency brake switch 84 is removed, causing the wheelchair lift assembly 18 to be inoperable and relay 92 to de-energize the pull coil timer 88, which in turn de-energizes the solenoid actuator 54, causing the locking claw 52 to move to its unlocked position. Once the locking claw 52 moves to the unlocked position, the driver can manually move the emergency brake actuator 26 from the engaged position to the disengaged position such that the vehicle 10 can now be operated in a normal manner.

Although the present invention has been described as being used with a vehicle having an emergency brake actuator 26 in the form of a handle mounted to the floor of the vehicle, it should be understood that the invention is equally applicable to any type of emergency brake actuator that is mounted in any location within the vehicle. To accommodate different types of emergency brake actuators and locations, the emergency brake lock assembly 24 of the present invention is modified by simply creating a new mounting plate 30 particularly suited to the type of emergency brake actuator for the vehicle. It is important, however, that the emergency brake lock assembly 24 of the present invention provide a mechanical locking member to prevent the emergency brake actuator from becoming disengaged when the wheelchair lift assembly is energized and being operated.

Various alternatives and embodiments are contemplated as being within the scope of the following claims particularly pointing out and distinctly claiming the subject matter regarded as the invention.

I claim:

1. A brake lock assembly for use in vehicles having an auxiliary door, a lift assembly positioned to operate out of the auxiliary door, and an emergency brake actuator movable between an engaged position and a disengaged position, the brake lock assembly comprising:
   an auxiliary door switch positioned to detect whether the auxiliary door is in an open position;
   an emergency brake switch positioned to detect whether the emergency brake actuator is in the engaged position; and
   a locking member movable between a locked position and an unlocked position, wherein the locking member is positioned to detain the emergency brake actuator when the emergency brake actuator is in the engaged position and the locking member is in the locked position;
   wherein the locking member moves to the locked position to detain the emergency brake actuator and prevent the emergency brake actuator from being moved to the disengaged position upon detection of both the auxiliary door in the open position and the emergency brake actuator in the engaged position; and
   wherein the lift assembly is energized only upon detection of the auxiliary door in the open position and detection of the emergency brake actuator in the engaged position.

2. The brake lock assembly of claim 1 further comprising a control arrangement coupled to the lift assembly, the locking member, the auxiliary door switch and the emergency brake switch, wherein the control arrangement moves the locking member to the locked position and energizes the lift assembly only upon detection of both the auxiliary door in the open position and the emergency brake actuator in the engaged position.

3. The brake lock assembly of claim 1 wherein the contacts of the auxiliary door switch are in the open position when the auxiliary door is closed.

4. The brake lock assembly of claim 1 wherein the contacts of the emergency brake switch are in an open position when the emergency brake actuator is in the disengaged position.

5. The brake lock assembly of claim 1 further comprising a solenoid actuator coupled to the locking member, the solenoid actuator being energizable to move the locking member between the unlocked position and the locked position.

6. The brake lock assembly of claim 1 wherein the auxiliary door switch generates a door closed signal when the auxiliary door is in the closed position, wherein the locking member is moved from the locked position to the unlocked position upon generation of the door closed signal.

7. A brake lock assembly for use in vehicles having an auxiliary door and a lift assembly positioned to operate out of the auxiliary door, the vehicle having an emergency brake actuator movable between an engaged position and a disengaged position, the brake lock assembly comprising:
   an auxiliary door switch positioned to generate a door open signal when the auxiliary door is in an open position;
   an emergency brake switch positioned to generate a brake engaged signal when the emergency brake actuator is in the engaged position; and
   a locking member movable between a locked position and an unlocked position, wherein the locking member is positioned to detain the emergency brake actuator in the engaged position when the locking member is in the locked position;
   wherein the lift assembly, the locking member, the auxiliary door switch and the emergency brake switch are connected such that the locking member moves to the locked position to engage the emergency brake actuator only when both the door open signal and the brake engaged signal are being generated to prevent the emergency brake actuator from being moved to the disengaged position.

8. The brake lock assembly of claim 7 wherein the lift assembly is energized only when both the door open signal and the brake engaged signal are being generated.

9. The brake lock assembly of claim 8 further comprising a control arrangement coupled to the lift assembly, the locking member, the auxiliary door switch and the emergency brake switch, wherein the control arrangement moves the locking member to the locked position and energizes the lift assembly only when the control arrangement is receiving both the door open signal and the brake engaged signal.

10. The brake lock assembly of claim 7 further comprising a solenoid actuator coupled to the locking member, the solenoid actuator being energizable to move the locking member between the unlocked position and the locked position.

11. A method of preventing a vehicle from moving while a lift assembly positioned in an auxiliary door of the vehicle is being operated, the vehicle having an emergency brake actuator movable between an engaged position and a disengaged position, the method comprising the steps of:

determining whether the emergency brake actuator is in the engaged position or the disengaged position;

determining whether the auxiliary door is in an open position or a closed position;

moving a locking member from an unlocked position to a locked position to receive and retain the emergency brake actuator when the auxiliary door is in the open position and the emergency brake actuator is in the engaged position; and energizing the lift assembly only when the locking member is in the locked position to prevent the emergency brake actuator from moving to the disengaged position.

12. The method of claim 11 further comprising the step of activating a solenoid actuator to move the locking member to the locked position.

13. The method of claim 11 further comprising the step of moving the locking member from the locked position to the unlocked position only when the auxiliary door is in the closed position and the emergency brake actuator is in the engaged position.

14. The method of claim 11 wherein the step of determining the position of the emergency brake actuator includes positioning an emergency brake switch to contact the emergency brake actuator when the emergency brake actuator is moved to the engaged position.

15. The method of claim 11 wherein the step of determining the position of the auxiliary door includes positioning an auxiliary door switch that contacts the auxiliary door when the auxiliary door is moved to the closed position.

16. A safety assembly for use in vehicles having an auxiliary door, a lift assembly positioned to operate out of the auxiliary door, and an emergency brake actuator movable between an engaged position and a disengaged position, the safety assembly comprising:

an emergency brake switch positioned to detect whether the emergency brake actuator is in the engaged position; and a locking member movable between a locked position and an unlocked position, wherein the locking member is moved to the locked positioned to detain the emergency brake actuator when the emergency brake switch detects that the emergency brake actuator is in the engaged position; and wherein the lift assembly is energized only upon the detection of the emergency brake actuator in the engaged position.

17. The safety assembly of claim 16 further comprising an auxiliary door switch positioned to detect whether the auxiliary door is in an open position, wherein the locking member moves to the locked position to detain the emergency brake actuator and prevent the emergency brake actuator from being moved to the disengaged position upon detection of both the auxiliary door in the open position and the emergency brake actuator in the engaged position.

18. The safety assembly of claim 17 further comprising a control arrangement coupled to the lift assembly, the locking member, the auxiliary door switch and the emergency brake switch, wherein the control arrangement energizes the lift assembly only upon detection of the emergency brake actuator in the engaged position, and wherein the control arrangement moves the locking member to the locked position upon detection of both the emergency brake actuator in the engaged position and the auxiliary door in the open position.

* * * * *